Jan. 20, 1959

G. STRANSKY 2,869,502

HATCH COVERS FOR SHIPS

Filed Feb. 27, 1953

INVENTOR
GUSTAVE STRANSKY

ATTORNEYS

Jan. 20, 1959

G. STRANSKY 2,869,502

HATCH COVERS FOR SHIPS

Filed Feb. 27, 1953

INVENTOR
GUSTAVE STRANSKY

BY
ATTORNEYS

Jan. 20, 1959  G. STRANSKY  2,869,502
HATCH COVERS FOR SHIPS
Filed Feb. 27, 1953  7 Sheets-Sheet 3

INVENTOR
GUSTAVE STRANSKY

BY
ATTORNEYS

Jan. 20, 1959

G. STRANSKY

2,869,502

HATCH COVERS FOR SHIPS

Filed Feb. 27, 1953

INVENTOR
GUSTAVE STRANSKY

BY *Hancock Downing Seebold*
ATTORNEYS

Jan. 20, 1959 G. STRANSKY 2,869,502
HATCH COVERS FOR SHIPS
Filed Feb. 27, 1953 7 Sheets-Sheet 6

INVENTOR
GUSTAVE STRANSKY

ATTORNEYS

Jan. 20, 1959  G. STRANSKY  2,869,502
HATCH COVERS FOR SHIPS
Filed Feb. 27, 1953  7 Sheets-Sheet 7

INVENTOR
GUSTAVE STRANSKY
BY
ATTORNEYS

United States Patent Office

2,869,502
Patented Jan. 20, 1959

2,869,502

HATCH COVERS FOR SHIPS

Gustave Stransky, New York, N. Y.

Application February 27, 1953, Serial No. 339,303

13 Claims. (Cl. 114—202)

The present invention relates to the art of ship building. More particularly this invention relates to improvements in hatch covers for ships.

From a specific standpoint, this invention relates to hatch covers for ships and improvements concerning the cooperation of the plural related cover sections.

Accordingly it is a phase of this application to further the development of hatch covers in relation to the disclosure embodied in my prior filed application Serial No. 336,502, filed February 12, 1953, and entitled Water-Tight Hatch Covers.

The present invention therefore has among other objects the development of proper and correlated gasketing arrangements for hatch covers of the sliding or rolling type.

Consistent with this object, it is a further object to provide adequate stowage arrangements for sliding or rolling type hatch covers.

It is a further object to provide a hatch cover arrangement including plural cover sections of the sliding or rolling type and means permitting the stowage of at least two sections in superimposition, one on top of the other.

Consistent with this object, it is a further development to provide a rolling hatch cover arrangement embodying plural sections covering adjacent hatch openings that are spaced from one another and switch means interposed in the space between the openings to provide for the stowage of the covers from one opening in superimposition on the covers of the other opening and vice versa.

It is a further object to provide a hatch cover arrangement embodying at least two cooperating sections covering a hatch opening and a unique and novel transverse seal means between the sections.

Consistent with the immediately aforementioned object, it is a specific object to provide a transverse seal between adjacent cover sections of a hatch cover embodying plural cooperating cover sections which incorporates a wedge-shaped compression member for cooperation with gasket strips having inclined faces carried by the respective adjacent cover sections.

It is a further specific object to improve the sealing relationship between adjacent sections of a hatch cover embodying plural sections and in which the sections are mounted for sliding or rolling movement relative to the hatch opening.

Consistent with the aforementioned objects, it is a further object to provide in conjunction with hatch covers, particularly of the sliding or rolling type, a structurally unique and long-lasting gasketing arrangement that embodies a compressive or wedging seal between adjacent sections in a direction transversely of the hatch and incorporates an adequate seal between the periphery of the coaming or hatch opening and the overlying cover sections.

It is still a further object to provide a hatch cover arrangement embodying the sealing relationship set forth in the immediately preceding object and further including means constituting hold-downs to insure a rigid and effective sealing relationship between the cover and the coaming and between the sections of a plural sectioned cover and which sealing relationship is water, gas and oil tight.

Further and more specific objects will be apparent from the following description taken in connection with the accompanying drawings illustrating the various phases of the invention as applied to several types of sliding or rolling covers and as regards the stowage feature as applied to two types of folding covers.

Therefore while the present development for the most part is illustrated in conjunction with sliding or rolling type hatch covers, it should be borne in mind that the important and salient features of the transverse sealing relationship between respective adjacent cover sections and the sealing relationship between the periphery of the hatch coaming and the cover sections are not to be limited to utilization with sliding or rolling type hatch covers. Obviously certain features of the gasketing and sealing development are ideally suited for use in conjunction with folding type hatch covers. This is in particular connection with the transverse seal embodying the compressive wedging action between adjacent cover sections that move in opposite directions.

The present invention in the art of hatch covers and certain detailed and specific phases thereof are illustrated in the accompanying drawings, in which.

Figure 1:
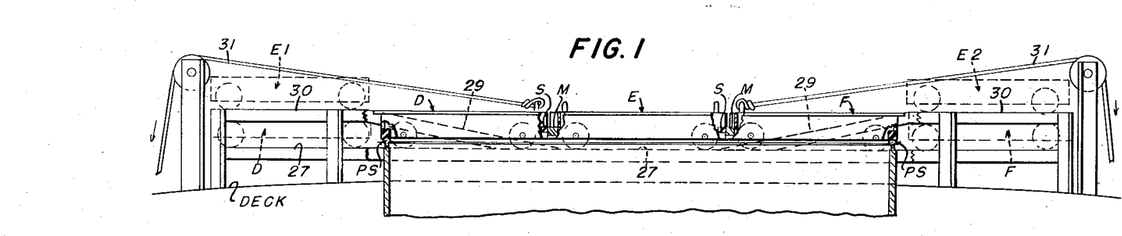
Figure 1 is a diagrammatic view partly in section and partly in elevation of a still further form of hatch cover arrangement of the sliding or rolling type embodying plural cover sections of the sliding or rolling type and illustrating the stowage of sections in superimposition.
Figure 2:
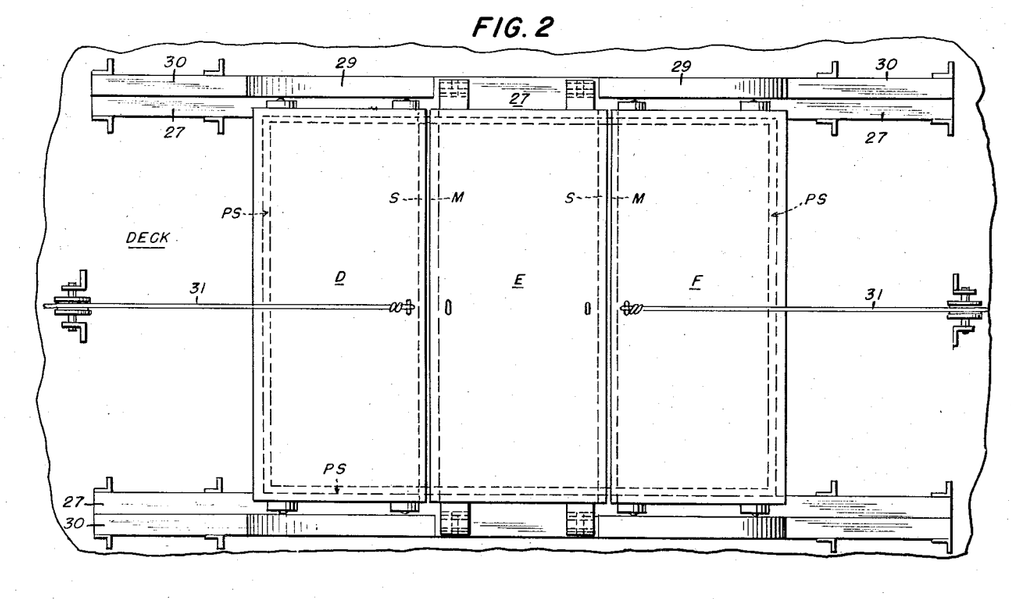
Figure 2 is a top plan view of the arrangement shown in Figure 1.

Figures 1 and 2 illustrate a modified form of stowage arrangement for a sliding or rolling hatch cover arrangement embodying three cover sections D, E and F. Between adjacent sections is a transverse seal gasket stripping and cooperating metal sealing members denoted diagrammatically at S and M, respectively, and described in detail hereinafter in connection with the description of Figures 22 to 26. The peripheral seal denoted diagrammatically at PS is of the type illustrated in Figure 16 in that the lip of the coaming is provided with half-rounds welded to opposite sides thereof and a channel-shaped formation is provided on the under surface of the cover and within the channels is mounted a gasket strip. Obviously before these cover sections can be rolled they must be lifted vertically and to accomplish this purpose an eccentric wheel arrangement can be used. In this modification cover sections D or F are rolled respectively to the right or left along a track 27 until they assume the position shown in dotted lines respectively to the left and right of this figure. Thereupon cover section E, whose rollers are mounted on longer pintles so that they are disposed outboard of the rollers on cover sections D and F, engage upwardly inclined ramps 29 located on opposite sides of the hatch opening outboard of the track 27. Thus cover section E can be pulled up either ramp 29 to roll along a horizontal extension of this ramp. Thus I have provided a unique stowage arrangement for a three-section cover in which the end sections can be respectively rolled along track sections 27 and the center section can be rolled to either direction thus permitting the manipulation of the covers so that only two cover sections need be moved to open position if necessary. In opening this hatch cover the cables 31 denoted diagrammatically are winch operated in a customary manner by fixing the end thereof to suitable bead eyes provided on the cover section.

Figures 3, 5, 7:
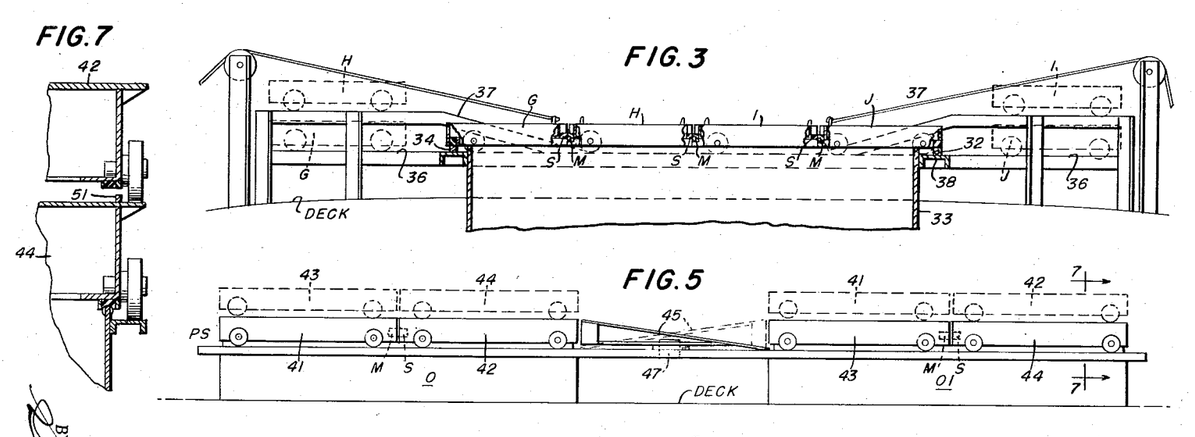
Figure 3 is a view similar to Figure 1 and illustrating a modified form of a similar hatch cover arrangement.
Figure 5 is a diagrammatic side view of a modified form of sliding or rolling type hatch cover arrangement embodying plural cover sections for closing hatch openings that are each respectively spaced from one another and including movable switch means mounted in the space between the hatch openings incorporating track surfaces for controlling the stowage of the sections of one opening in superimposition on the sections of the other and vice versa.
Figure 7 is a fragmentary cross-sectional view taken along line 7—7 of Figure 5.

Figure 3 is an arrangement quite similar to Figure 1 except the hatch opening is of longer dimensions. This arrangement, as is the case with Figure 1, is particularly suitable for hatches opening in an athwartship direction. To account for the wider dimensions of the hatch opening four cover sections are utilized, G, H, I and J, between adjacent edges of which are suitable transverse seals again denoted diagrammatically at S and M but illustrated in detail in Figure 25. The peripheral seal is of the type shown in Figure 4 and includes a sealing rib 32 mounted on a channel member 38 projecting laterally of the coaming 33 cooperating with a gasket strip 34 carried on the under edge of the respective hatch covers. This peripheral seal extends along the sides and ends of the hatch opening. Pairs of rollers are provided at each end of each cover section with the rollers of cover sections H and I having longer spindles so that they are outboard of the rollers of sections G and J. Thus the track 35 is wider in the central portion between the end limits of sections H and I. It includes an extension 36 at each end to support sections G and J when they are moved respectively to the left and the right and the track further includes upwardly inclined ramp sections 37 at each end to support the rollers of sections H and I when they are moved respectively to right and left to a position where they are superimposed over cover sections G and J in a manner similar to the arrangement of Figure 5.

Figure 4:
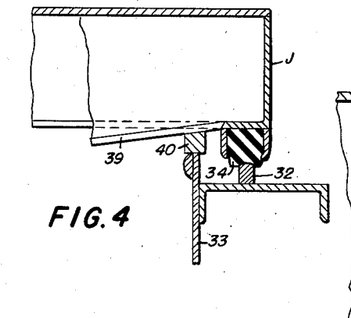
Figure 4 is a fragmentary cross-sectional view on an enlarged scale and illustrating one form of sealing relationship between the edge of one of the hatch cover sections and the underlying coaming structure.

Figure 4 is a sectional view through one of the marginal edges of one of the cover sections of Figure 3 and discloses the coaming 33 having the inverted channel member 38 projecting laterally thereof and upon which is mounted the sealing rib 32 cooperating with the gasket strip 34 housed on the under surface of the edges of the cover section such as J. Each cover section is provided with transversely extending stiffeners 39 and depending from the stiffener adjacent the gasket strip is a rib member 40 that cooperates with the upper edge of the coaming 33 and this rib member 40 is a supporting rib which supports the weight of the cover so that the entire weight of the cover is not borne by the gasket strip 34. Obviously in connection with manipulation of this cover arrangement the cover sections are moved vertically before they are rolled athwartship to open position in order to break the seal. This can be done by the eccentric mounting of the rollers or effected simultaneously with the rolling movement in the manner disclosed in my prior application.

Figure 6:
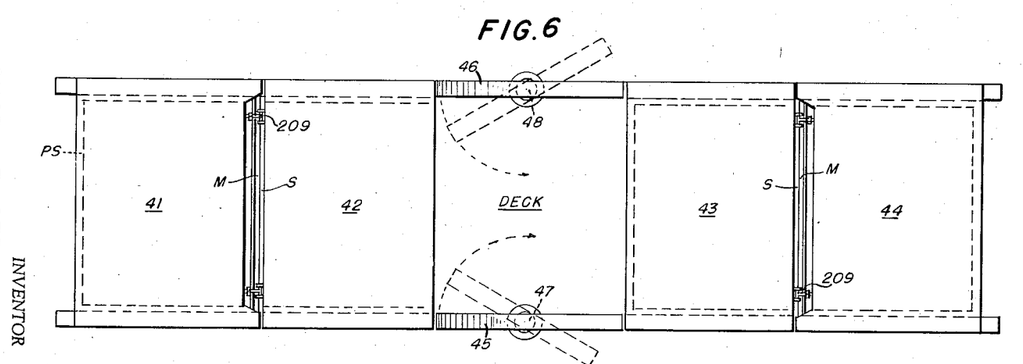
Figure 6 is a plan view of the arrangement shown in Figure 5.

Figure 5 discloses a modification of a sliding or rolling hatch cover arrangement in which plural sections are stowed in superimposition upon other sections and includes an arrangement in which a pair of sections 41 and 42 overlie one hatch opening indicated at O and another pair of sections 43 and 44 similarly overlie a second opening OI. These hatch openings are spaced from one another by a portion of the deck and switch members 45 and 46 are mounted for rotational movement on a vertical axis about pintles 47 and 48. These switch members incorporate inclined track sections one end of which is at a level with the track sections 49 and 50 along the sides of the hatch openings and the other end of which is at a level with the upper surface of the hatch covers. It thus follows that with both switch members transversely aligned in the position shown in full lines in Figure 5, cover sections 43 and 44 can be moved to the left up the switch members 45 and 46 and along the top surface of cover sections 41 and 42 to stowage relationship thereon. As soon as the need for access to hatch opening OI has passed, cover sections 43 and 44 can be rolled back down the switch members to closed position, the switch members rotated in the manner indicated diagrammatically in Figure 6 so that they occupy the dotted line position shown in Figure 5 whereupon cover sections 41 and 42 can be rolled to the right up the switch members to stowed re'ationship in superimposition on top of cover sections 43 and 44. It is also to be pointed out that in this arrangement it will be necessary to impart the vertical movement to the cover sections either before they are rolled or by employing means to effect this vertical movement simultaneously with the application of pulling force to the covers in the hatch opening direction. In connection with this arrangement transverse seal means, shown diagrammatically at S, M, and described in detail with reference to Figures 22 to 27, are embodied between cover sections 41 and 42 and cover sections 43 and 44 and peripheral gasket means PS within the concept of this invention and also of the type embodied in my prior filed application, Serial No. 336,502, are to be employed in effecting the sealing relationship between each cover and the underlying opening. The essential characteristics of this relationship reside in the employment of the inclined rotatable switch members on the deck space between adjacent groups of hatch openings permitting the manipulation of one pair of cover sections to stowage re'ationship directly on top of the other pair and vice versa. It is further pointed out that this switch means can be incorporated with hatch openings arranged in series in the fore and aft direction of the ship where for example sixteen openings extend on opposite sides of the switch members, thus one group of sixteen covers can be manipulated to stowed relationship on top of the other group of sixteen covers. Any number of openings desired can be employed utilizing the concept of this invention so long as space is arranged between any two openings.

Figure 7 illustrates in fragmentary sectional view, the provision of bead members 51 extending along the top of each cover section of the group, that is in the fore and aft direction of the cover sections.

Figures 8, 9:
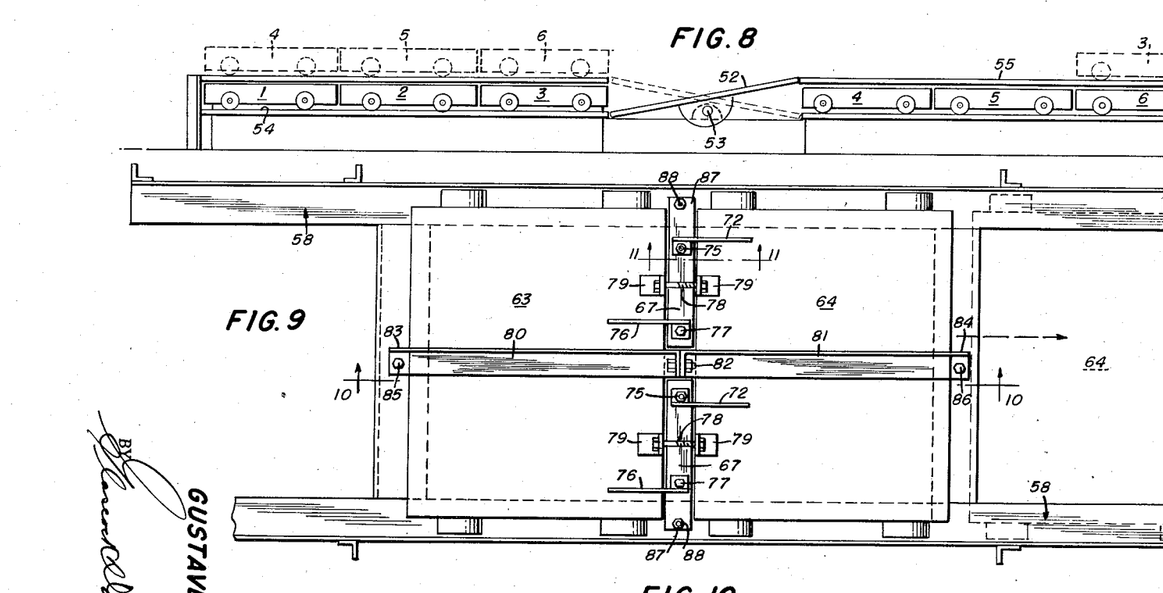
Figure 8 is a view similar to Figure 5 but illustrating a modified form of switch arrangement between adjacent hatch openings.
Figure 9 is a plan view of a form of sliding or rolling type hatch cover incorporating plural cooperating sections movable athwartship in their opening and closing movement and including hold-downs extending transversely of the cover arrangement for effectively maintaining the cover in rigid closed sealing relationship with the opening.

Figure 8 discloses a modification of the switch and track arrangement. In this modification cover sections A1, A2, and A3 are arranged on one side of the pairs of switch members 52. These switch members instead of being inclined tracks are track portions mounted for rotation about a horizontal axis denoted at 53. The switch members are selectively movable in a position where one of the same is shown in full lines extending from a lower track section 54 supporting covers A1 to A3 to an upper track section 55 supported above cover sections A4 to A6. Thus after imparting the required vertical movement to cover sections A1 to A3, they may be rolled to the right up the switch members 52 and on to track sections 55. As in the arrangement of Figures 5 and 6, for access to the openings underlying each of the cover sections A4 to A6, cover sections A1 to A3 are rolled back down the track, down switch members 52 to their original position, thence the switch members are rotated to the dotted line position and cover sections A4 to A6 are moved to the left to a stowed position overlying cover sections A1 to A3.

Figure 10:
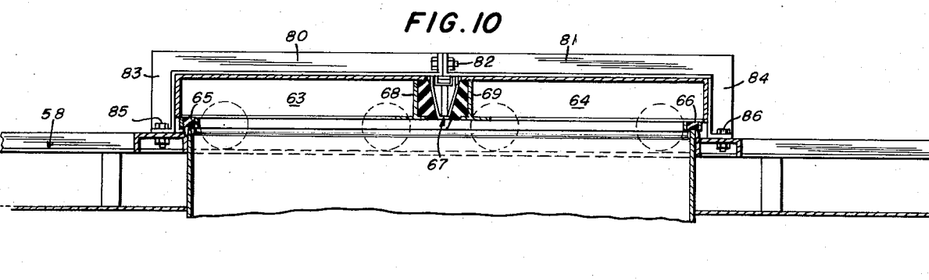
Figure 10 is a sectional view taken on lines 10—10 of Figure 9 and illustrating diagrammatically the wedge type sealing means embodied between the cover sections.

Figures 9 and 10 illustrate a modification of a sliding or rolling cover arrangement including two cover sections 63 and 64 which are movable athwartship in a hatch opening movement. Each section carries pairs of rollers and as customary, these rollers are supported on track members 58 which extend alongside the opening and beyond the same so that by employing suitable winch or motor operated cables, the covers can be rolled respectively to the left and right, as indicated by the dotted line position of cover 64. This modification is primarily concerned with illustrating hold-down means and a modified transverse seal arrangement which makes the cover gas, oil and water-tight and which provides for a tighter closing of the cover if such is desired. In this form the cover sections 63 and 64 are rolled to positions in which their sealing strips 65 and 66 overlie the subjacent coaming edges. Between the sections is my novel transverse seal which is illustrated in more detail hereinafter and includes a wedge-shaped metallic compression member 67 cooperating with inclined gasket strips 68 and 69 carried respectively by cover sections 63 and 64. Further in the teaching of my prior filed application Serial No. 336,502, these inclined gasket sections extend the full depth of the cover and the wedge member is likewise of corresponding vertical dimensions. Furthermore these gasket strips extend the full transverse dimensions of each cover section and the opposite ends of the wedge member and the adjacent sections of gasket strip further cooperate with the peripheral gasket strip underlying the same as set forth hereinafter. The compression wedge member 67 is mounted for vertical movement relative to the marginal edges of the hatch opening.

Figure 11:
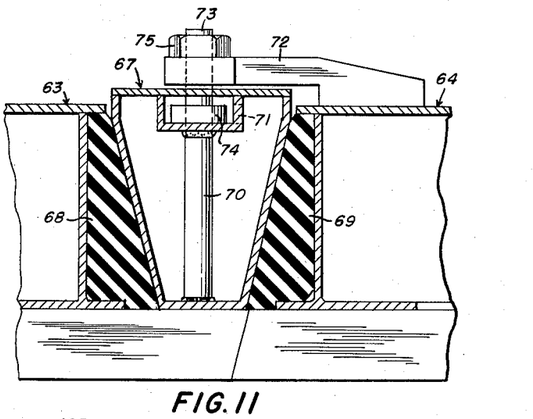
Figure 11 is an enlarged fragmentary view partly in section on line 11—11 of Figure 9 and partly in elevation of a detail of the structure embodied in Figures 9 and 10 with particular reference to the wedge type seal means embodied between the cover sections.

Figure 11 illustrates one arrangement of such mounting in which the wedge member 67 which is hollow has a plurality of bolts 70 extending therewithin to support cup members 71 respectively underlying brackets 72 mounted on the top of cover section 64. These brackets 72 have an internally threaded aperture at the end thereof through which is engaged a bolt 73 having a head 74 therein housed in the compartment formed by the cup member 71 and the top wall of the wedge member. Of course this will necessitate a rather complicated assemblage of the wedge member in relation to its association with cover section 64. However I have described hereinafter further arrangements for raising and lowering the wedge member which are much more simplified constructions. It follows that suitable manipulation of bolt head 75 which may be keyed to the bolt 73 will effect threading axial movement in opposite directions of the bolt through the threaded aperture in the bracket 72 and corresponding raising and lowering movement of the wedge member depending on the direction of movement imparted to the bolt head which in this instance functions similar to a hand wheel. Thus the wedge member 67 is associated with cover 64. Bracket members 76 mounted on the top of cover section 63 incorporate bolt means 77 which act in the manner of set screws to increase the downward pressure exerted on the top surface of the wedge member. Thus after the cover sections have been manipulated to closed position and dogged down by conventional means, further dogging means including an athwartship extending bolt 78 mounted in lugs 79 are manipulated to draw the cover sections toward one another and to increase the rigidity of the union between the covers. Then the athwartship extending hold-down bars 80 and 81 are connected by the bolt means 82 and the depending edges 83 and 84 of these bars are dogged down by the bolt and nut means 85 and 86 respectively cooperating with an inverted channel member extending along the end edges of the coaming, then suitable extensions 87 of the top bar of the compression wedge member are similarly dogged down by a bolt means 88. As a final resort, the bolt means 77 and 75 are manipulated to further tighten the compression wedge member. Thus these two hatch sections 63 and 64 are tied together in the athwartship direction by one or more dog bolts 78 and the bolt means 82 and further tied down to the channel bar mounted along the periphery of the coaming by the bolt means 85, 86 and 87. This arrangement thus presents a very rigid relationship of two hatch covers and plural vertical dogging means that in effect exert downward pressure across the entire central portions of the cover sections in the athwartship direction and across the joint between the sections with additional dogging means exerting compressional force on the joint between the sections from opposite sides of this joint and from the top of the joint. This arrangement can be used for multiple sections, that is of a number more than two, if the athwartship extending hold-down bars similar to 80 and 81 are suitably modified so that for all the inner sections these bars have flanges at right angles to the axis of the bars for respective cooperation and connection of the bars of adjacent inner hatch sections. The same type of transverse seal and hold-down arrangement can be multiplied for hatch cover arrangements incorporating more than two sections. If desired the arrangement of Figures 9 to 11 can be utilized without the athwartship extending hold-down means since these bars, such as 80 and 81, can be either welded to the underlying cover sections 63, 64 or merely rest in engagement therewith and drawn down by the tightening of the bolt means 85 and 86. Preferably however in the event a very rigid and tight closing of the cover sections is desired these bars are welded to the top of the cover sections.

Figure 12:
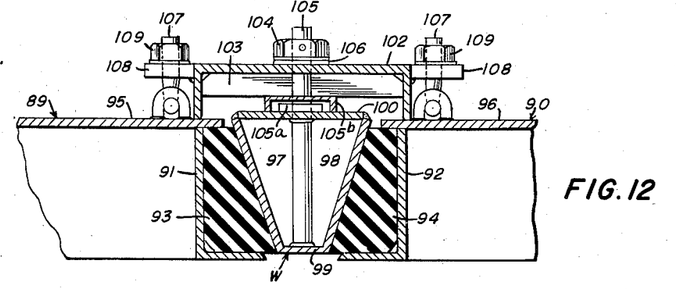
Figure 12 is a view similar to Figure 11 but illustrating in cross-section on line 12—12 of Figure 14 a modified arrangement of the wedge type sealing means including means for selectively associating the movable member of the sealing means with either of the hatch cover sections that move in opposite directions in their opening movement.
Figure 13:
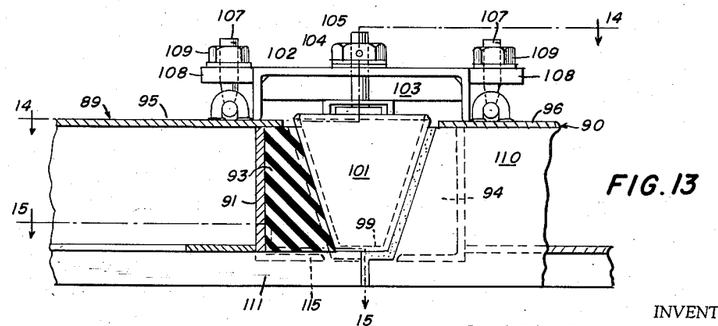
Figure 13 is a cross-sectional view similar to Figure 12 but illustrating the cooperative sealing relationship between the movable wedge member and the periphery gasket extending along the sides of the cover sections.
Figure 14:
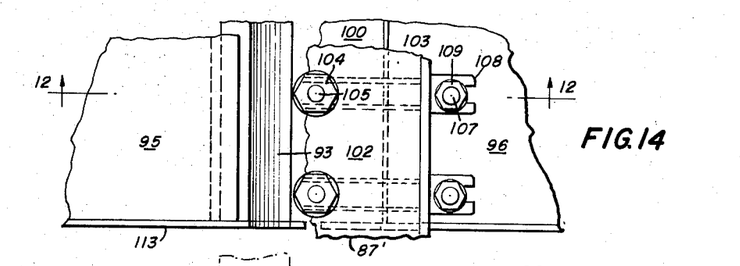
Figure 14 is a plan view along lines 14—14 of Figure 13.

Figure 12 illustrates on a smaller scale and in fragmentary cross-section through a joint between adjacent covers, a compression or wedge sealing means with the section being taken inboard of the lateral edges of the covers along lines 12—12 of Figure 14. In this modified construction the adjacent transverse edges of cover members 89 and 90 are formed by L-shaped angle irons 91 and 92 respectively with the short web of the L of the irons directed toward one another. These webs constitute the bottom seat for gasketing material in the form of strips 93 and 94 that extend transversely throughout the width of the cover and also in depth between the under surface of the top plates 95 and 96 of each of the respective covers. This gasket stripping, as is true with all gasket strips disclosed in this application, can be desirably made of rubber, synthetic rubber, such as neoprene, or a combination of rubber faced with a facing or lining material, or rubber having an exposed layer of a conveyor belting material which is extremely durable and which is composed of layers of rubber and duck with the exposed faces of the conveyor belting being rubber or neoprene, if neoprene is embodied in the manufacture of the particular conveyor belting utilized. It is to be pointed out that the seal stripping preferably extends the full depth of the cover and tapers downwardly and outwardly and constitutes a relatively thick strip of gasketing material carried by the adjacent edges of the covers. To provide the sealing relationship, a wedge member W, which for the sake of saving in weight is made hollow and suitably reinforced, cooperates with the strips 93 and 94. This wedge member W includes opposite inclined sides 97 and 98, a base 99 and a top plate 100 respectively welded together along their adjacent edges. This wedge member extends the full width of the hatch and is closed by opposite end plates, one of which is indicated at 101 in Figure 13. In order to permit vertical up and down movement of the wedge member W, the same is provided at spaced points throughout its width with upstanding bolt members 105 threaded on their ends. These bolt members pass in threaded engagement through apertures in a transverse stiffening bar 102 which is of inverted channel configuration with the opposite edges thereof resting on the tops of adjacent covers and which channel member is further provided with transverse interior stiffeners one of which is indicated at 103. The lower end of each bolt 105 is headed as at 105a and a housing or socket means 105b is welded to the top plate 100 of the wedge member. A washer 106 is placed about each bolt member 105 and rests on the top surface of the stiffening bar 102. A nut 104 is pinned, keyed or otherwise fastened to each bolt 105. Thus upon rotation of nut 104, bolts move axially up or down through stiffening bar 102 and since the housing 105b is welded to the top of the wedge member manipulation of the bolts 104 imparts up or down movement to the wedge member. To dog down the stiffening bar, bolt members 107 are swingably mounted on the top of each cover section and can be swung upright into the slots of slotted lugs 108 projecting laterally from and welded to the side webs of the stiffening member 102. Another end washer means 109 will apply downward pressure to the lug members and thus move the stiffening member downwardly and dog it securely on top of the hatch cover members and thus at least partially seat the wedge member. In the utilization of this arrangement it is clear that with either bolt 107 loose and lying flat on its associated hatch cover top, the engagement of the opposite series of nuts 109 with the lugs 108 will maintain the stiffening bar and the wedge member in association with that hatch cover section so that when the hatch covers are slid away from each other the stiffening bar will move with one cover section. Obviously the cover sections are provided with the peripheral seal means to be described hereinafter and the rollers and cover lifting means for breaking the horizontal joint as hereinbefore described with reference to the other arrangements are utilized. The stiffening bar in functioning similar to the arrangement in Figures 9 to 11 projects beyond the opposite side edges of the cover sections and has additional dogging means associated with these projecting portions 87. These additional dogging means, see Figure 17, comprise swingable bolts 88' carrying tightening nuts and fitting in slots in the ends of projections 87'.

Thus the transverse stiffening bar can be securely fastened downwardly not only on the tops of the cover sections but further downward movement can be imparted thereto by dogging the projecting ends thereof and by the conventional dogging down of the cover sections. Additionally dogging means of the type denoted at 78 and 79 in Figure 19 can be welded to the respective hatch covers to draw them toward one another. Furthermore as a variant of the aforedescribed arrangement the channel shaped stiffening bar 102 can have its projecting ends protrude slightly beyond the side edges of the cover and mitered and a vertically disposed corresponding shaped stiffening bar with mitered ends can be welded thereto to extend downwardly along the sides of the cover and have a laterally or outboard extending plate welded to the base of this downwardly extending channel member and which plate is then dogged down in relation to the coaming or hatch opening. Thus the vertical extent of the channel shaped stiffening means will effectively cover the sides of the joint between adjacent sections and furnish an additional protection if this arrangement is desired.

Figure 20:
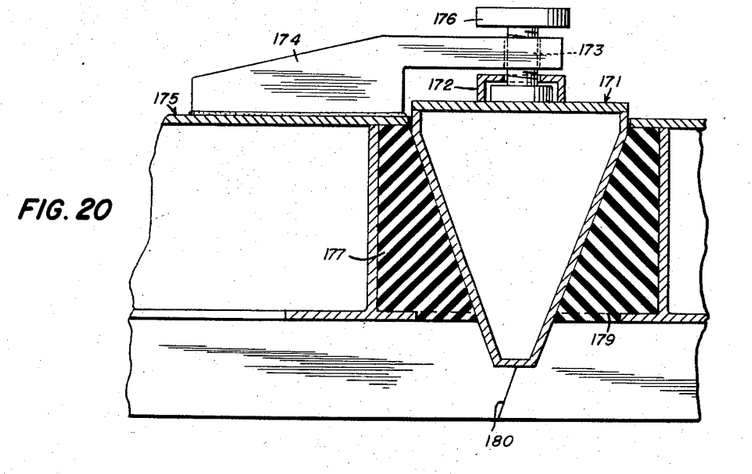
Figure 20 illustrates partly in section and partly in elevation and diagrammatically a transverse sealing arrangement between adjacent cover sections incorporating a wedge member and the cooperative seal between the transversely extending wedge member and the periphery gasket.

In Figure 13, which illustrates the same structure of Figure 12, similar parts have corresponding numbers. This figure particularly illustrates the end seal at the opposite transverse ends of the hatch joint and illustrates that the side cover plate, only one of which 110 is illustrated, is cut-away rearwardly of the exposed face of the gasket strip 94 to permit compressive action or, in other words, to prevent the side plate 98 of the wedge member abutting the edge of the hatch cover side plate. Furthermore the base plate 99 of the wedge member bears against the periphery gasket 111 over the joint between adjacent sections thereof. The joint between the adjacent sections of gasket strip 111 can be angled as indicated in Figures 11 or 20.

In Figure 14 the parts are illustrated in plan and numbered correspondingly to Figure 13.

Figure 15:
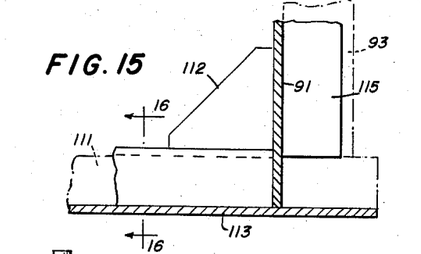
Figure 15 is a view partly in section and partly in elevation and taken along the line 15—15 of Figure 13.
Figure 16:
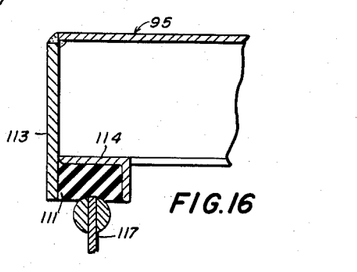
Figure 16 is a sectional view taken along lines 16—16 of Figure 15.

In Figure 15 a detail is shown in which the corner joint between the edge plate 91 and the side plate 113 of one cover section such as 95, Figure 12, is provided with a horizontally disposed corner bracket 112 that rigidifies this connection since it is welded along one edge to the side plate 91 and along its other edge to the L-shaped gasket retaining member 114, Figure 16. This is desirable since the bottom flange 115 of end plate 91 is cut-away to permit the mounting of the periphery gasket in the joint section.

Figure 16 illustrates particularly the periphery gasketing arrangement in which the L-shaped member 114, one end of which is welded to the side plate of each cover section, such as 113, houses and receives a gasketing strip 111. The coaming 117 of the hatch cover is provided with half-round bars 118 welded to opposite sides of the upper edge thereof and which half-rounds constitute a compression bar in sealing relationship with the gasketing strip 111.

Figures 17, 18, 19:
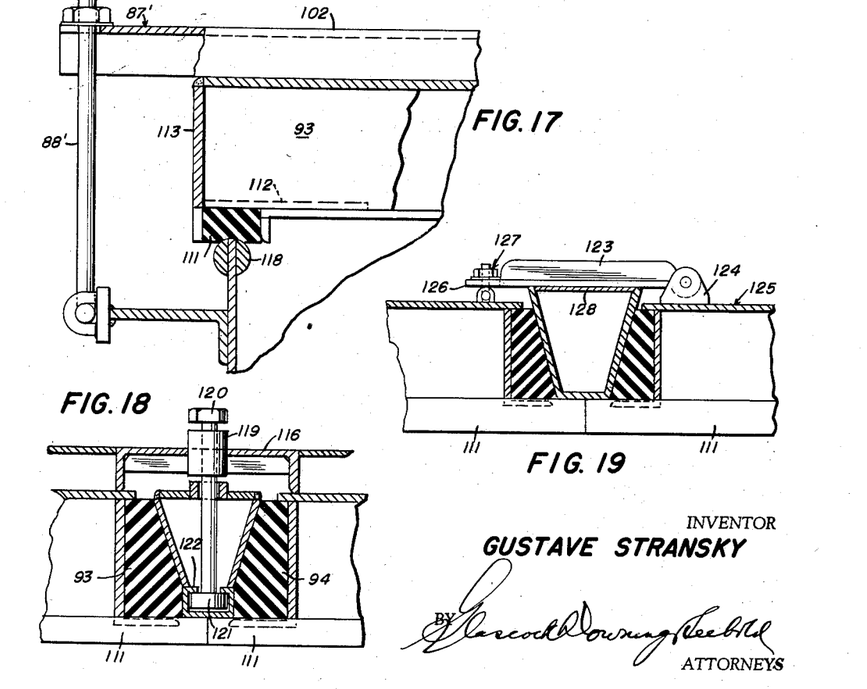
Figure 17 is a view partly in section and partly in elevation and taken through the joint between adjacent cover sections with the wedge member removed with particular reference to the structure of Figure 13 as viewed from the right.
Figures 18 and 19 are views partly in section and partly in elevation and illustrating modified forms of the wedge sealing means between adjacent cover sections.

Figure 17 illustrates the gasket strip 93 overlying and in engagement with the periphery gasket strip 111.

Figure 18 illustrates a modification of the immediately aforedescribed joint in which the gasketing strip arrangement is the same. However, the wedge member is modified so that it can be moved up and down vertically independently of the movement of the stiffening bar 116. This latter stiffening bar is provided with bushes 119 through which are threadedly engaged a compression bolt 120 having a head 121 on the lower end thereof and rotatably disposed in a housing 122 provided as the bottom plate of the wedge member. It is believed clear that upon rotation of bolt 120 threaded engagement through the bush 119 either raises or lowers the compression wedge member. In connection with the aforedescribed modification one or more similar compression bolts and bush members can be mounted on stiffening bar 102.

Figure 19 illustrates another arrangement in which the compression wedge member is merely a hollow metal member consisting of top and bottom and opposite inclined side plates. The top thereof is welded to a hinged strongback 123 pivotally mounted to a bracket 124 carried by one cover section denoted at 125 and which strongback has a slotted end 126 for cooperation with a dogging bolt means 127. It is believed that the operation of this form is clear in that the wedge member is always associated with cover section 125 and to permit proper manipulation of the cover sections the dogging bolt means 127 have to be backed off and lowered to the top of the cover section on which they are mounted and then the strongbacks pivoted in their brackets 124 to raise the compression wedge member out of the way. In this form the top plate 128 can be extended beyond the marginal edges of the cover sections and dogged down similar to the stiffening bar 102 or the arrangement shown in Figure 9. Suitable dogging means are mounted on the adjacent cover sections to draw these cover sections together in a horizontal plane.

In Figure 20 is shown a wedge member 171 having a socket 172 on the top thereof in which is housed the headed end of a bolt member 173 which is in threaded engagement with a bracket 174 welded to one cover section 175. A hand wheel or similar device 176 on the top of the bolt 173 serves upon rotation to raise or lower the bolt and thus the wedge member 171. This wedge member has inclined sides which cooperate with the gasket strips 177 and 178 and is further extended downwardly below the bottom marginal line of the cover sections to cooperate with cut-out portions 179 of the peripheral gasket strips. Thus these peripheral gasket strips are pressed against the lower extremities of the wedge member when the cover sections are drawn toward one another and the inclined joint 180 between these peripheral gasket strips is covered by the bottom plate of the wedge member when this latter is tightened downwardly by manipulation of the hand wheel device 176.

Of course it is obvious that in all of the afore-described sealing relationships the cover sections are lifted vertically before they are moved or are lifted vertically simultaneously with their movement to opened position.

Figure 21:
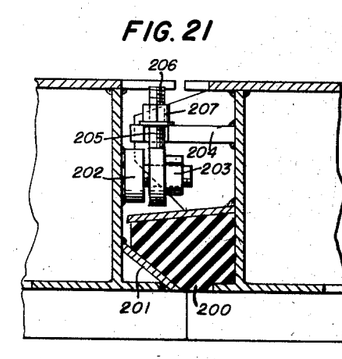
Figure 21 is a diagrammatic sectional view with some parts in elevation illustrating a transverse joint between adjacent cover sections and including means to draw the cover sections toward one another in a tightening movement.
Figure 22:
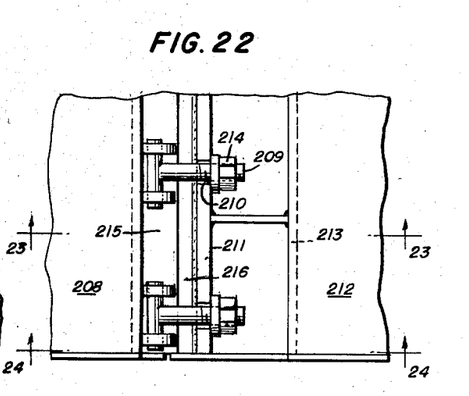
Figure 22 is a fragmentary top plan view of a modified center and periphery joint arrangement between adjacent cover sections.
Figure 23:
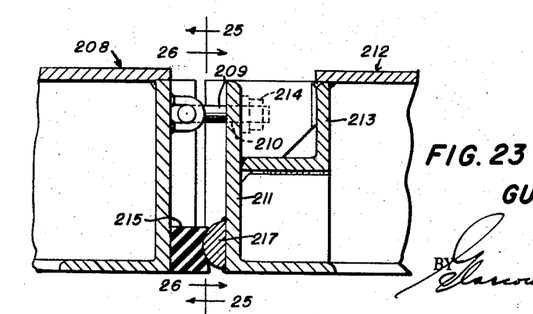
Figure 23 is a cross-sectional view taken along lines 23—23 of Figure 22.
Figure 24:
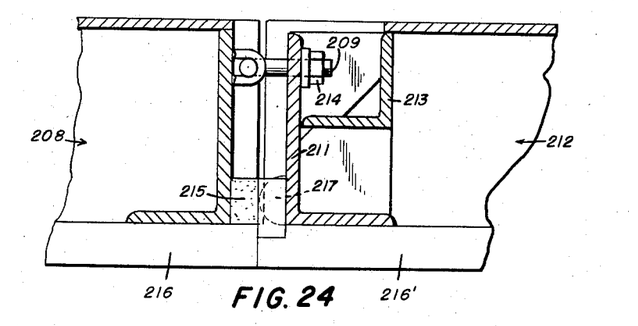
Figure 24 is a cross-sectional view taken along lines 24—24 of Figure 22.
Figure 25:
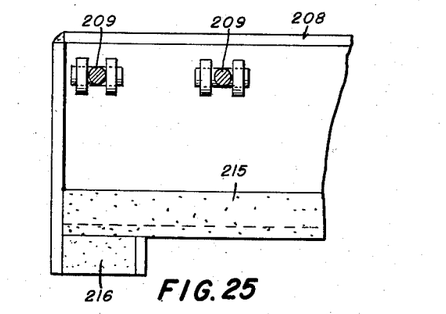
Figure 25 is a cross-sectional view taken along lines 25—25 of Figure 23.

Figure 21 illustrates a sectional detail through a transverse joint of the type embodied in my prior filed application in which an inclined beveled seal strip 200 seals against a metal seal bar 201 when the cover sections are drawn toward one another by dogging means which include a bolt member 202 rigidly mounted to one cover section and a nut 203 mounted thereon. As shown, the top plates of the cover sections overlying the bolt member are cut-away for access. A bracket bar 204 is mounted on the opposite cover sections and is notched at 205 so that a swinging bolt 206 which is apertured and mounted on bolt 202 can be swung upwardly into the notch 205 whereupon the tightening of a nut 207 will join the two cover sections together so that a tightening of the nut 203 by utilizing an off-set wrench for example will draw the two cover sections together.

Figure 26:
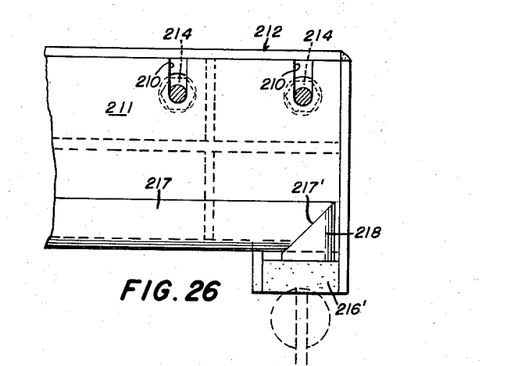
Figure 26 is a cross-sectional view taken along lines 26—26 of Figure 23.

A further development of the seal including dogging means to draw adjacent cover sections together is illustrated in Figures 22 to 26 in which cover section 208 is provided with swingable dogging bolts 209 that engage in slots 210, Figure 26, formed in the end plate 211 of cover section 212. In this arrangement the top plate of cover section 212 is cut-away transverse to the hatch and the side plates are inclined downwardly so that an L-iron 213 welded between the under surface of the top plate and the inner surface of the end plate 211 forms a drain channel. It is believed clear that upon manipulation of nuts 214 on the swinging dogging bolts the two cover sections are drawn toward one another to compress the seal which includes a gasket strip 215 carried by the lower edge of the end plate of cover section 208 and a half-round compression bar 217 carried by the lower edge of end plate 211. Figure 27 illustrates that this half-round compression bar is mitered at its ends at 217' and a vertically disposed extension 218 is welded thereto, this extension will seal against the portion of the gasket strip 215 that overlies the peripheral gasket 216 and the adjacent peripheral gasket 216' is cut-away or notched to accommodate the lower end of the downturned portion 218 of the half-round compression bar. This sealing relationship is believed clearly illustrated in Figures 25 and 26.

In connection with sealing arrangements set forth herein and in my prior filed application, I wish to point out that the material constituting the gasket strip is selected in accordance with the particular type of seal used which determines the degree of hardness of the gasket. Thus in those arrangements of broad facial contact, when the weight of the cover is pressing against the gasket and as in most peripheral seals in my prior filed application, it is of advantage to use a gasketing of substantial durability and hardness, for example conveyor belting or rubber or neoprene of a durometer hardness preferably exceeding 60 which is necessary to provide the required durability and hardness in relation to the cover weight.

However, in instances where the weight of the cover is supported by ribs such as 40, Figure 4, softer rubber may be used. Thus with reference to the arrangements referred to in the preceding paragraph, softer rubber or neoprene of 40 or less durometer would be preferably used.

In transverse seals, since the weight of the cover is of no consequence and the compression can either be controlled by dogging or is determined by the hinging of the cover rubber or neoprene of medium durometer preferably between 40 and 60 should be used.

As indicated, where wedges are used as the metal seal member, the face of the gasketing should be hard and durable and when rubber or neoprene is used should be of a durometer hardness in excess of 60. Conveyor belting of similar or better hardness characteristics is especially suitable for the wedge type seals.

With particular reference to the arrangement of Figure 4, I wish to specifically point out that the strengthening rib 40 can constitute a continuous rib extending substantially throughout the under surface of each hatch cover. Thus it can constitute a bar. This stiffening rib means is inwardly of the peripheral side edge of each cover a distance such that in the closed position the rib immediately overlies the top of the coaming. The rib is to have such vertical dimensions that when the cover is closed the under surface of the rib engages the top surface of the coaming and the sealing bar carried either by the cover or the track depresses the cooperating gasket strip carried respectively either by the cover or the track to a depth of approximately ⅛" to ⅜". Thus with this arrangement soft rubber or soft neoprene can be used for the gasketing.

As a further modification, I wish to point out that in connection with this transverse channel member overlying a wedge type seal such as in Figures 12 and 18 in lieu of the swinging dogging bolt arrangement along one edge of the channel member can be eliminated and the lower marginal edge of this channel member can be welded to the top of the subjacent cover.

Further as regards the cooperation between the strengthening rib 40 and the upper surface of the coaming, it is desirable in certain instances that the under surface of the strengthening rib be slightly concave where it must seat on a coaming structure that has a convex rim so that the sealing engagement between rib and rim is facilitated.

I wish to make clear that the teachings of this application as to the nature and hardness characteristics of the gasketing material are not to be limited to the specific materials previously mentioned in this or my prior filed application. Thus any suitable packing material which possesses or is treated to possess the desired hardness and durability characteristics in relation to the particular cover and seal design and weight factors involved may be used. For example and not by way of limitation, a packing of cork and rubber, flax, or leather alone, or combinations thereof, or flax combined with rubber or neoprene may be used.

It will also be evident that various other forms embodying substitutions, eliminations, additions and combinations may be resorted to without departing from the broad spirit and scope of the appended claims and hence I do not wish to limit myself in all respects to the exact and specific disclosures of the selected examples of hatch cover arrangements.

What I claim is:

1. In a hatch cover arrangement, means defining at least two spaced hatch openings, track means along opposite sides of each opening, at least two cover sections for each opening, said sections having flat tops, roller means on each section supporting the same on the track means for rolling movement therealong and movable switch means mounted between the openings including means engageable by the roller means for selectively switching the sections rolled from over one opening to a stowed position on the flat tops of sections overlying the other opening.

2. In a hatch cover arrangement as defined in and by claim 1, in which the switch means comprises spaced upwardly inclined track sections and vertical pivot means in alignment with the track means on the opposite side of the openings for mounting the inclined track sections for selective rotation between positions where the inclined track sections cooperate with the respective openings.

3. In a hatch cover arrangement as defined in and by claim 1, and roller guide ribs extending along the top of each cover adjacent each side edge.

4. In a hatch cover arrangement wall means delimiting a hatch opening, at least two cover sections cooperable with the opening for closing the same, means supporting the sections for movement relative to the opening, the opening having opposite sides and ends and the cover sections including top plates and side and end plates, a peripheral seal for the opening including a metallic sealing means carried by the wall means delimiting the opening and solid, compressible gasket strip means carried by the side and end plates of the cover sections that overlie the periphery of the opening, the gasket strip means carried by the side plates of the sections including portions extending beyond the end plates that are adjacent one another when the cover sections are closed, means operatively embodied between the ends of the cover sections that are adjacent one another for drawing said sections together and to engage said portions of the gasket strip means together, a transverse seal between said sections including a solid, compressible gasket strip means carried by the end plate of one of said cover sections and a sealing bar carried by the end plate of other of said sections, both said second mentioned gasket strip means and said sealing bar being mounted subjacent the top plates of the cover sections and including portions in sealing engagement with each other and with said portions of the first mentioned gasket strip means when the cover sections are closed.

5. In a hatch cover arrangement as claimed in claim 4, in which the means for drawing the sections together are mounted subjacent the top plates of the cover sections and said metal sealing bar including a portion extending transversely of the opening and opposite end portions connected to said transversely extending portions and which end portions extend vertically, said end portions having a length sufficient to bear against the gasket strip means extending transversely of the opening on the adjacent cover section and also against the gasket strip means carried along the sides of the said adjacent section and which constitute a part of the peripheral seal when the sections are in closed position.

6. In a hatch cover arrangement means defining a hatch opening including opposite ends and sides, at least two cover sections for closing the opening, means for supporting the sections for movement relative to the opening, each cover section including top plates and adjacent end plates, a peripheral seal between the means defining the opening and the overlying end plates of the cover sections including gasket strip means carried by the cover sections and a metal sealing bar carried by the means defining the opening, the gasket strip means carried by the respective sections including portions adjacent the meeting line of the sections in sealing engagement with one another when the sections are closed, a transverse seal between the end plates of the respective cover sections that are adjacent one another, said transverse seal comprising a gasket strip means carried by one of the adjacent end plates at a level above the gasket strip means carried along the sides of said sections and a cooperable metal sealing bar means carried by the other of the said adjacent end plates, said last mentioned metal sealing bar means being convexly curved in cross section and including opposite end portions extending generally vertically and having a length to simultaneously cooperate in sealing relationship with the transversely extending gasket strip means on the adjacent end plate and the gasket strip means on the sides of the cover section that form part of the peripheral seal, when the sections are closed and means for drawing the said two cover sections together.

7. In a hatch cover arrangement wall means delimiting a hatch opening, at least two cover sections, means supporting the sections for movement relative to the opening, the opening having opposite sides and ends and each cover section including top plates and opposite side and end plates, sealing means for the opening comprising a metallic sealing means projecting above the upper level of the wall means delimiting the opening, cooperable solid, compressible gasket strip means carried by the side and end plates of the cover sections for engaging said metallic sealing means when the sections are closed, the gasket strip means carried by opposite side plates of the respective sections including projecting portions extending horizontally beyond the end plates of the sections that are adjacent one another when the cover sections are closed, a transverse seal between the sections including cooperating gasket strip means and metal sealing bar means carried by the end plates of the respective sections that are adjacent one another when the sections are closed, said last mentioned gasket strip means being solid and compressible and including opposite end portions in overlying abutting relation with the projecting portion of the first mentioned gasket strip means carried by the same section, at least said second metal sealing bar means including opposite end portions adjacent the end plates of its associated section in engagement with the portions of the first mentioned gasket strip means carried by said section that extend beyond the said end plate thereof, means for drawing the sections together when they are in position to close the opening and means for tightening the sections on the opening.

8. In a hatch cover arrangement wall means delimiting a hatch opening, at least two cover sections, means supporting the sections for movement relative to the opening, the opening having opposite sides and ends and each cover section including top plates and opposite side and end plates, sealing means between the sections and the opening comprising a metallic sealing means projecting above the upper level of the wall means delimiting the opening, cooperable solid compressible gasket strip means carried by the side plates of the cover sections for engaging said metallic sealing means when the sections are closed, the gasket strip means carried by opposite side plates of the respective sections including portions extending beyond the end plates of the sections that are adjacent one another when the cover sections are closed, a transverse seal means between the end plates that are adjacent one another when the sections are closed comprising a transversely extending gasket strip means and a cooperable transversely extending metal seal means extending the length of said end plates, at least said metal seal means including opposite end portions engaging said portions of the first mentioned gasket strip means and means for tightening all said seal means.

9. A hatch cover arrangement as claimed in claim 8 in which said transverse metal seal means comprises a vertically movable member carried by one of said sections and the means for tightening all said seals includes means for moving said member vertically into sealing relationship.

10. In a hatch cover arrangement, means delimiting a hatch opening, at least two cover sections mounted for movement relative to the opening, each section including a top plate and side and end plates depending therefrom, a seal between the sides of the respective sections and the opening comprising a metallic sealing member extending uninterruptedly along the sides of the opening and solid and compressible gasket strip means extending along the sides of each section, said gasket stripping having substantial transverse dimensions for cooperation with said metallic sealing member, said sections including end plates that are adjacent one another when the opening is closed, said gasket stripping means including end portions projecting beyond the respective adjacent end plates, a seal extending transversely of the opening including a metallic sealing member carried by one of said adjacent end plates and a solid compressible gasket stripping means carried by the other of said adjacent end plates, each said second mentioned metallic sealing member and gasket stripping having substantial transverse dimensions to provide adequate sealing engagement and each including end portions overlying the respective projecting end portions of the gasket stripping means that extend beyond the respective adjacent end plates whereby when the sections are closed the first mentioned gasket stripping means are sealed against the first mentioned metallic sealing member, the end faces of the projecting end portions of the first mentioned gasket stripping are sealed against one another, the second mentioned metallic sealing member and gasket stripping means are in sealing engagement across the end plates and the terminal ends of the second mentioned metallic sealing member and gasket stripping means are in sealing engagement with each other and with the underlying projecting portions of the first mentioned gasket stripping means.

11. In a hatch cover arrangement, means delimiting a hatch opening, at least two cover sections mounted for movement relative to the opening, each section including a top plate and side and end plates depending therefrom, a seal between the sides of the respective sections and the opening comprising a metallic sealing member extending uninterruptedly along the sides of the opening and solid and compressible gasket stripping means extending along the sides of each section interiorly of the side plates, said gasket stripping having substantial transverse dimensions for cooperation with said metallic sealing member, said sections including end plates that are adjacent one another when the opening is closed, said gasket stripping means including end portions projecting beyond the respective adjacent end plates, a seal extending transversely of the opening including a metallic sealing member carried by one of said adjacent end plates and a solid compressible gasket stripping means carried by the other of said adjacent end plates, each said second mentioned metallic sealing member and gasket having substantial transverse dimensions to provide adequate sealing engagement and each including end portions overlying the respective projecting portions of the gasket stripping means that extend beyond the respective adjacent end plates whereby when the sections are closed the first mentioned gasket stripping means are sealed against the first mentioned metallic sealing member, the end faces of the projecting portions of the first mentioned gasket stripping are sealed against one another, the second mentioned metallic sealing member and gasket stripping means are in sealing engagement across the end plates and the terminal ends of the second mentioned metallic sealing member and gasket stripping means are in sealing engagement with each other and with the underlying projecting portions of the first mentioned gasket stripping means, said second mentioned metallic sealing member comprising a convexly curved sealing bar means of substantial transverse dimensions relative to the corresponding dimensions of the second mentioned gasket stripping means, and said sealing bar means having vertically disposed terminal end portions.

12. In a hatch cover arrangement means delimiting a hatch opening, at least two cover sections mounted for movement relative to the opening, sealing means between the sides of the sections and the periphery of the means delimiting the opening, comprising solid compressible gasket stripping carried by the sides of the respective sections and including portions projecting beyond the ends of the sections that are adjacent one another, a cooperating metallic sealing member extending along the sides of the opening, the projecting portions of said gasket stripping each terminating in an end surface adapted for sealing engagement along the sides of the opening at a meeting line between said adjacent end plates, and sealing means extending transversely of the opening between the sections comprising a solid, compressible gasket stripping carried by one of said adjacent end plates and including a laterally exposed sealing surface and terminal end portions overlying and engaging the projecting portions of the first mentioned gasket stripping that extend beyond said one end plate, a cooperating metallic sealing member carried by and extending along the other of said adjacent end plates and including terminal portions overlying and engaging at least a portion of the projecting portions of the first mentioned gasket stripping that extend beyond said other end plate, and means for drawing the sections into sealing engagement with one another and with the means delimiting the opening.

13. A hatch cover arrangement for vessels, including a coaming delimiting a hatch opening, a plurality of cover sections supported for movement relative to the opening, each cover section including top, side and end plates, a peripheral seal for the opening comprising a metallic sealing member extending around, attached to and projecting above the coaming, compressible solid gasket stripping means supported by the respective sections and extending along the side plates thereof and the end plates of the respective sections that are adjacent the opposite ends of the opening, said gasket stripping means having an exposed undersurface for cooperation with the metallic sealing member, the gasket stripping means extending along the sides of the respective sections including terminal portions projecting beyond the end plates of the sections that are adjacent to one another when the sections are closed, said terminal portions having end faces disposed in abutting sealing relation intermediate said adjacent end plates when the sections are closed, a transverse seal extending between the respective sections and comprising a laterally exposed, solid compressible gasket stripping means carried on one of said adjacent end plates, extending thereacross and including opposite end portions having a horizontal surface in overlying abutting sealing relation with the upper surface of the terminal portions of the first mentioned gasket stripping that extends beyond said one end plate, a cooperable metallic sealing member carried by the other of said adjacent end plates, projecting laterally thereof, extending thereacross and including opposite vertically disposed end portions each terminating in a horizontal surface overlying and in sealing relation with at least the upper surface of the terminal portion of the first mentioned gasket stripping means that extend beyond said other end plate, said second mentioned metallic sealing member having a substantial transverse dimension and the vertical surface of the respective vertically disposed end portions thereof being in facing relation with the end portions of said laterally exposed gasket stripping means and releasable dogging means for tightening the sections to the coaming and drawing them toward one another when the opening is closed, whereby the vertical surface of the opposite end portions of the second mentioned metallic sealing member are compressed against the adjacent laterally exposed surfaces of the opposite end portions of said second mentioned gasket stripping and also against at least a limited surface of the terminal portions of the first mentioned gasket stripping that extend beyond said one end plate, and the said first mentioned gasket stripping being compressed against the first mentioned metallic sealing member and the end faces of the terminal portions of the first mentioned gasket stripping being compressed against one another.

References Cited in the file of this patent

UNITED STATES PATENTS

| | | |
|---|---|---|
| 2,093,362 | Nelson | Sept. 14, 1937 |
| 2,194,012 | Dawson et al. | Mar. 19, 1940 |
| 2,197,824 | Young | Apr. 23, 1940 |
| 2,256,087 | Hay | Sept. 16, 1941 |
| 2,360,276 | Redmond | Oct. 10, 1944 |
| 2,373,355 | Temple | Apr. 10, 1945 |
| 2,627,835 | Mege | Feb. 10, 1953 |
| 2,641,214 | MacGregor et al. | June 9, 1953 |
| 2,726,623 | Jernstrom | Dec. 13, 1955 |
| 2,753,827 | Sabin | July 10, 1956 |

FOREIGN PATENTS

| | | |
|---|---|---|
| 651,343 | Great Britain | Mar. 14, 1951 |
| 812,648 | Germany | Sept. 3, 1951 |
| 984,154 | France | Feb. 21, 1951 |